United States Patent [19]
Smith

[11] Patent Number: 5,737,507
[45] Date of Patent: Apr. 7, 1998

[54] REPRESENTATION OF INTER-RELATIONSHIPS BETWEEN GRAPHICAL OBJECTS IN A COMPUTER DISPLAY DEVICE

[75] Inventor: Randall B. Smith, Palo Alto, Calif.

[73] Assignee: Sun Microsystems, Inc., Palo Alto, Calif.

[21] Appl. No.: 499,137

[22] Filed: Jul. 7, 1995

[51] Int. Cl.$^6$ .................................................. G06F 15/00
[52] U.S. Cl. .................................................. 395/133
[58] Field of Search ........................ 395/139, 138, 395/133, 134; 345/117, 119, 120

[56] References Cited

U.S. PATENT DOCUMENTS

| | | | |
|---|---|---|---|
| 5,485,563 | 1/1996 | Fisher | 395/139 |
| 5,491,769 | 2/1996 | Moller | 395/139 |

FOREIGN PATENT DOCUMENTS

| | | |
|---|---|---|
| 0 567 699 A1 | 3/1993 | European Pat. Off. . |
| WO 93/15455 | 8/1993 | WIPO . |

OTHER PUBLICATIONS

Eric A. Bier, Maureen C. Stone, Ken Fishkin, William Buxton, and Thomas Baudel, "A Taxonomy of See–Through Tools, " *Proceedings of CHI '94 Human Factors in Computing Systems* (Boston, Apr.), ACM, 1994, pp. 358–364.

Joseph Dumas and Paige Parsons, *Communications of the ACM*, "New Programming Environments", vol. 38 No. 6, Jun. 1995, pp. 45–56.

*IBM Technical Disclosure Bulletin*, "Graphical Depiction of Database Table and View Relationships", vol. 37, No. 6A, Jun. 1994, pp. 477–480.

*Primary Examiner*—Phu K. Nguyen
*Attorney, Agent, or Firm*—James D. Ivey

[57] ABSTRACT

Relationships between first one of a number of graphical objects, such as windows, displayed in a computer display device and several others of the graphical objects are displayed to the user in the form of a relationship window in response to an event associated with the first graphical object. The event, e.g., a resize event in a view relationships mode, is one in which the user selects the first graphical object whose relationships are of interest and specifies a position within a computer display device in which to display the relationship window in a single gesture. For example a resize gesture by the user selects a graphical object and directs display of the relationship window since resize gestures are commonly implemented in conventional graphical user interfaces and are therefore familiar and intuitive to the user. The relationship window includes representation of the graphical objects related to the first graphical object and representation of the relationships between the related graphical object and the first graphical object. Graphical objects which are not related to the first graphical object are occluded by the relationship window to the extent those graphical objects overlap the relationship window. The first graphical object and the related graphical objects are positioned within the relationship window such that the relationship window appears not to occlude the first and related graphical objects. The relationship window includes tools and mechanisms for altering, i.e., editing or modifying, the relationships between the first and related graphical objects.

39 Claims, 14 Drawing Sheets

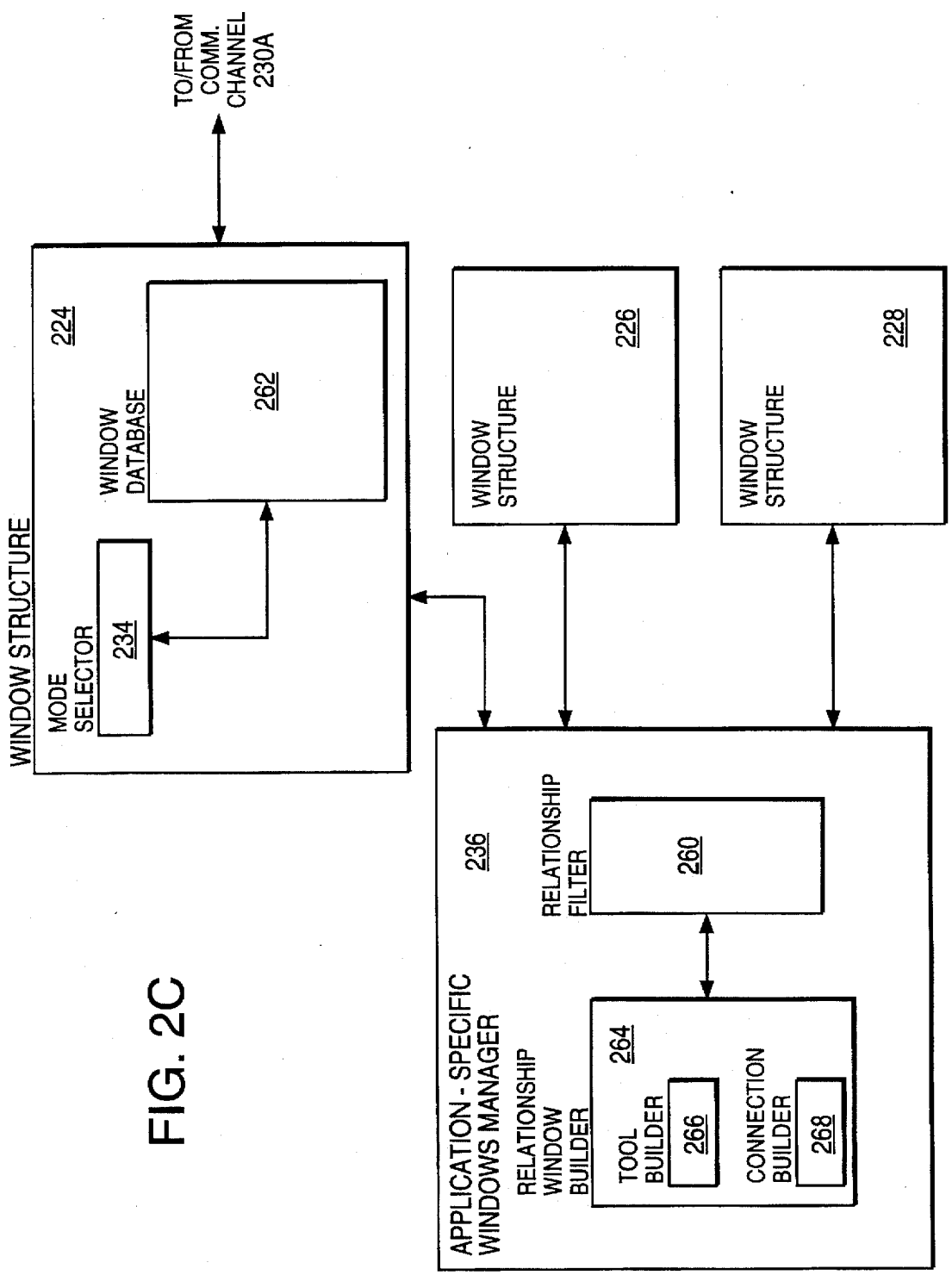

REPRESENTATION OF INTER-RELATIONSHIPS BETWEEN GRAPHICAL OBJECTS IN A COMPUTER DISPLAY DEVICE

FIELD OF THE INVENTION

The present invention relates to a graphical user interface for a computer and, in particular, to an interface which represents, in a computer display device, inter-relationships between various graphical objects displayed in the computer display device.

BACKGROUND OF THE INVENTION

Windows-based graphical user interfaces are becoming a necessary component of computer systems in nearly every computing environment. Examples of windows-based graphical user interfaces include (i) the operating system of the Macintosh computer available from Apple Computer, Inc. of Cupertino, Calif., (ii) the Microsoft Windows operating system which is available from Microsoft Corporation of Redmond, Wash. and which executes on IBM PC compatible computers based on the X86 series of microprocessors manufactured by Intel Corporation of Santa Clara, Calif., and (iii) the X-Windows computing environment used in conjunction with the Unix operating system on workstation computers such as the SPARC station computer available from Sun Microsystems, Inc. of Mountain View, Calif.

In a windows-based graphical user interface, multiple graphical objects such as icons and windows are displayed simultaneously in a computer display device. Each graphical object has graphical content. As used herein, "graphical content" of a graphical object is data which define the appearance of the graphical object on a computer display device. A window is a graphical object which is generally a partitioned, typically rectangular portion of a computer display device in which graphical content associated with a particular task is represented. A graphical object can overlap one or more other graphical objects and can partially or completely occlude those graphical objects and can be occluded, partially or completely, by those graphical objects. Frequently, numerous graphical objects are simultaneously displayed in a computer display device and many of such simultaneously displayed graphical objects are inter-related. For example, one window can include tools for changing the color of the border of a second, related window, or multiple, inter-related windows can display information pertaining to a single computer process.

In many windows-based graphical user interfaces, the user is permitted to change the size and display position of the various graphical objects displayed in the computer display screen. Using a conventional pointing device such as a mouse, trackball, lightpen, touch-sensitive pad, etc., in conjunction with a conventional drag-and-drop interface, the user can enlarge or reduce a window as displayed in a computer display device to display more or less graphical content, respectively. In addition, the user can move a graphical object from one portion of a computer display device to another portion. In many such windows-based graphical user interfaces, the user is permitted to move a graphical object independently of related graphical objects such that inter-related graphical objects can be displayed in mutually remote portions of a computer display device. As a result, it is not always immediately clear to the user whether, and if so, how, the various graphical objects displayed in a computer display device are inter-related.

Difficulty in immediately recognizing inter-related graphical objects is particularly significant in graphics-based development environments such as the Visual Works programming environment available from Parc Place Systems, Inc. of Sunnyvale, Calif. In such an environment, a computer program developer, i.e., a user of a computer system who develops computer programs, creates a number of graphical objects, including windows, and alters characteristics and behavior of such graphical objects to conform to a desired task. Such behavior is typically described in terms of computer instructions to be performed under circumstances prescribed by the developer. Characteristics of such graphical objects include relationships to other graphical objects. For example, a window which alters color in accordance with user commands typically includes, as a characteristic, data identifying which color characteristic of which graphical object is controlled in response to such user commands. In developing a complex computer program using such a graphics-based development environment, developers often display simultaneously as many as ten or more windows and other graphical objects, many of which are inter-related.

In some graphics-based development environments, the developer can cause the relationships between the various displayed graphical objects to be represented graphically in the computer display device. Such relationships can be represented, for example, by a line drawn between two inter-related graphical objects. When relationships between many interrelated graphical objects are represented simultaneously, the result is what some developers informally refer to as a "ball of spaghetti," i.e., a complex, unintelligible web of graphically represented relationships which provides little, if any, useful information to the developer. Displaying only relevant relationships as specified by the developer would be an improvement. However, requiring the developer to specify, as an additional step, the relationships which should be represented detracts from the developer's concentration in configuring and assembling the various components of the computer program under development.

What is therefore needed is a tool whereby a user can quickly, easily, and intuitively view selected inter-relationships between a multitude of graphical objects displayed simultaneously in a computer display device.

SUMMARY OF THE INVENTION

In accordance with the present invention, the familiar gesture of the user-interface for resizing a graphical object is used in a novel manner to provide a user with a simple, convenient, efficient, and intuitive mechanism for displaying selected relationships between the selected graphical object and other graphical objects displayed in a computer display device. The selected graphical object can be, for example, a window, and the graphical objects which can be related to the selected graphical object can include, for example, other windows. In a view relationships mode, resizing a graphical object simultaneously and in a single gesture (i) selects the resized graphical object as the graphical object whose relationships are of interest and (ii) displays representations of relationships between the resized graphical object and other graphical objects. In addition, the resized graphical object occludes graphical objects which are unrelated to the resized graphical object and which overlap the resized graphical object. In general, resizing in the view relationships mode works as follows:

The user uses the familiar resize gesture in a novel mechanism according to present invention to resize and enlarge a selected graphical object to cover, i.e., overlap, partially or completely one or more other graphical objects. A resize event is generated and issued to a computer process which is responsible for the graphical content of the selected window. In response to the resize event, the computer process represents in the newly enlarged graphical object, which is sometimes called the "relationship window", (i) the selected graphical object, (ii) any of the covered graphical objects which are related to the selected graphical object, and (iii) the relationships between the covered graphical objects and the selected window. Any partially or completely covered graphical objects which are not related to the selected graphical object are occluded partially or completely, respectively, by the relationship window. The selected graphical object and the covered graphical objects represented in the relationship window are represented in the same position and state as those graphical objects are represented in the computer display device immediately prior to the display of the relationship window so that related covered graphical objects appear not to be occluded.

BRIEF DESCRIPTION OF THE DRAWINGS

FIG. 2C is a block diagram illustrating more completely components of the application process of FIGS. 2A and 2B.

DETAILED DESCRIPTION

In accordance with the present invention, the common and widely familiar user-interface for resizing a window is used to provide a user with a simple, convenient, efficient, and intuitive mechanism for displaying selected relationships between a window and other graphical objects. The example of FIGS. 1A–E is illustrative.

Figure 1A:
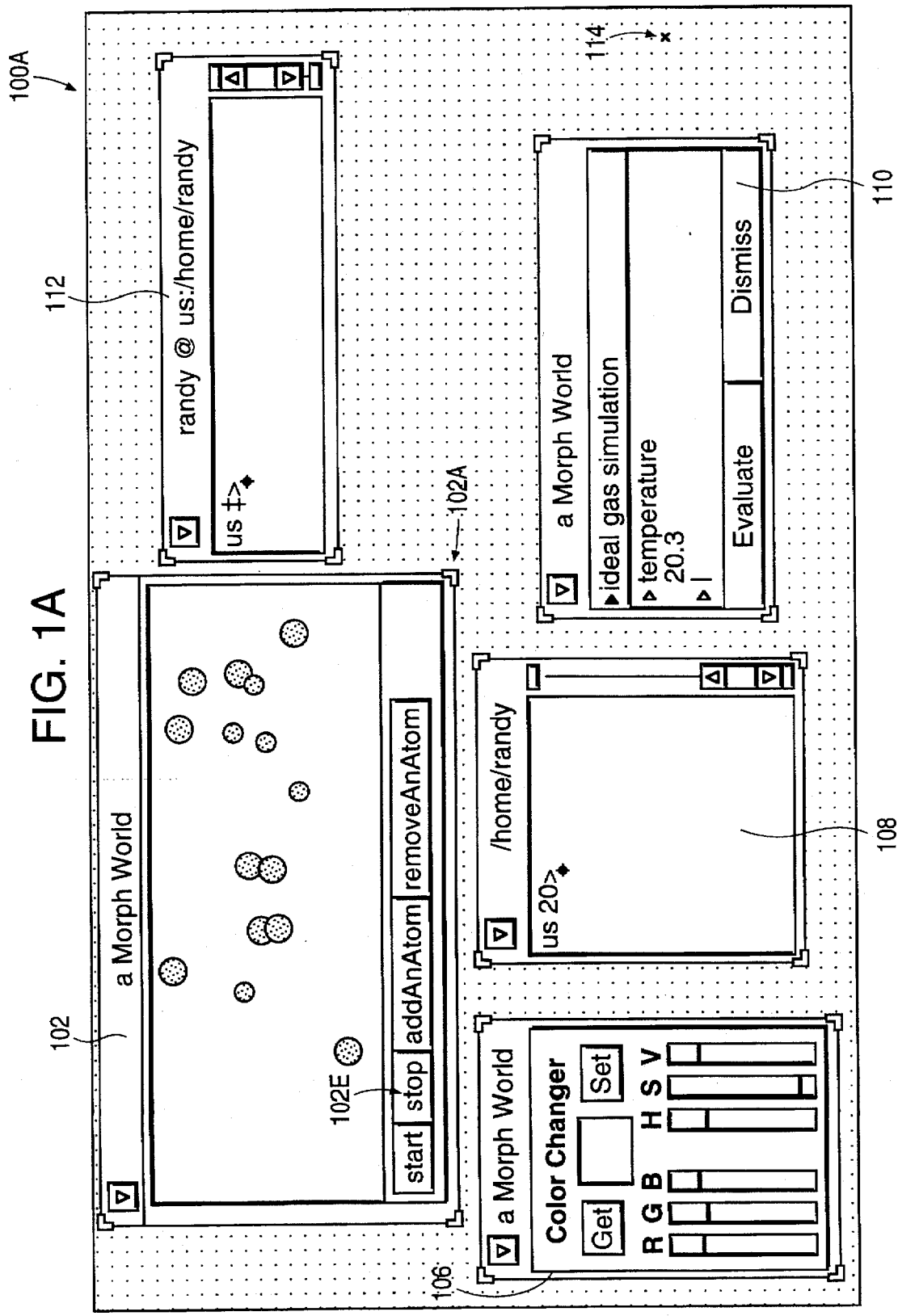
FIGS. 1A–E are computer display device screen views illustrating the operation of the present invention.

In FIG. 1A, a screen view 100A of a computer display device, which is described below more completely, includes windows 102, 106, 108, 110, and 112. Window 102 is a window in which graphical information is displayed. In this example, window 102 includes a graphical representation of a computer simulation of an ideal gas. Window 106 is a color select window by which a user can specify a particular color. Window 110 is a text interface window in which a user receives textual output and which prompts the user for textual input entered by the user through a keyboard as described more completely below. Textual interfaces are well known and are not described further herein.

In the example of FIGS. 1A–E, a user wishes to see which of windows 104–112 are related to window 102.

Figure 1B:
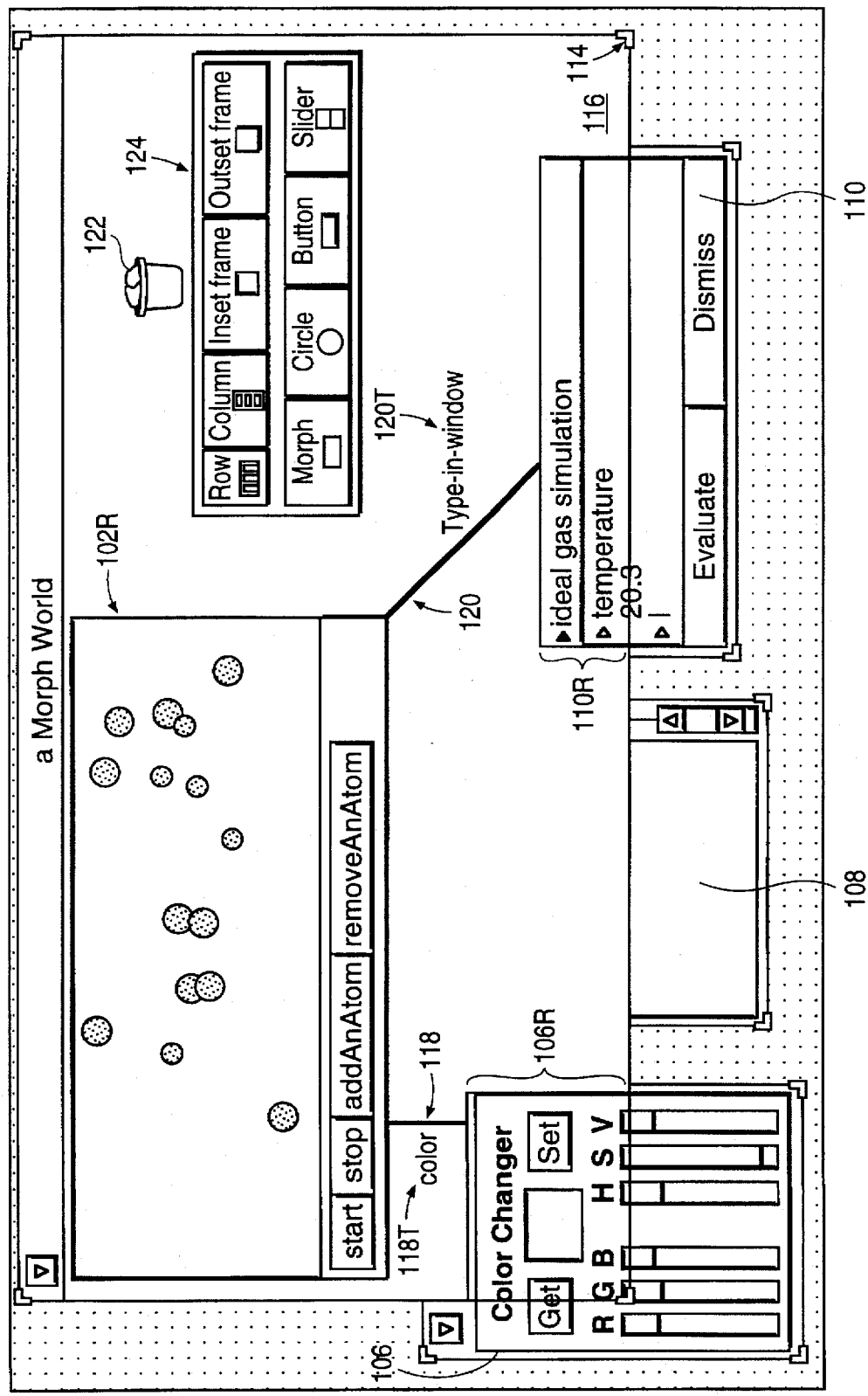
Figure 1C:
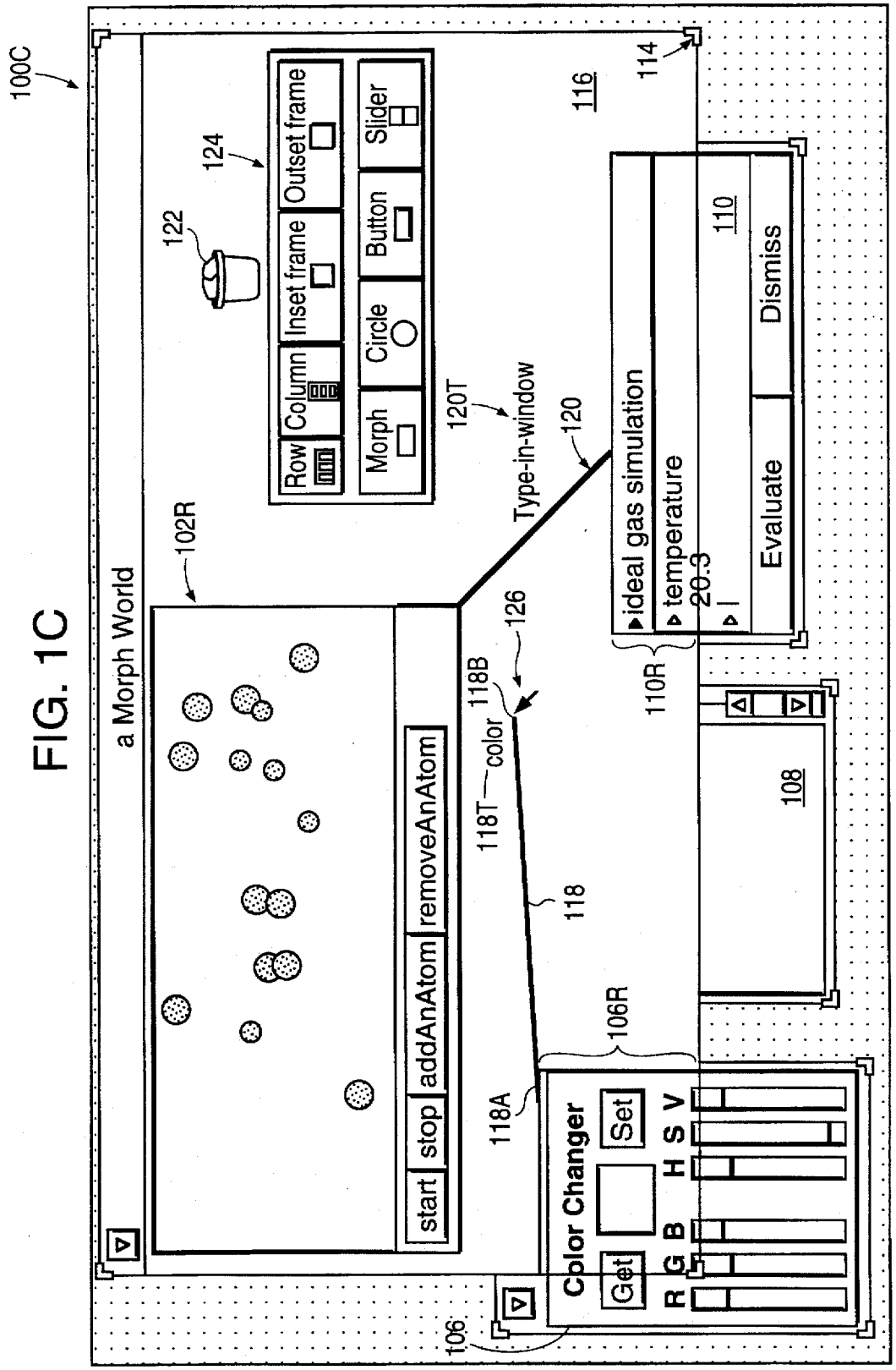
Figure 1D:
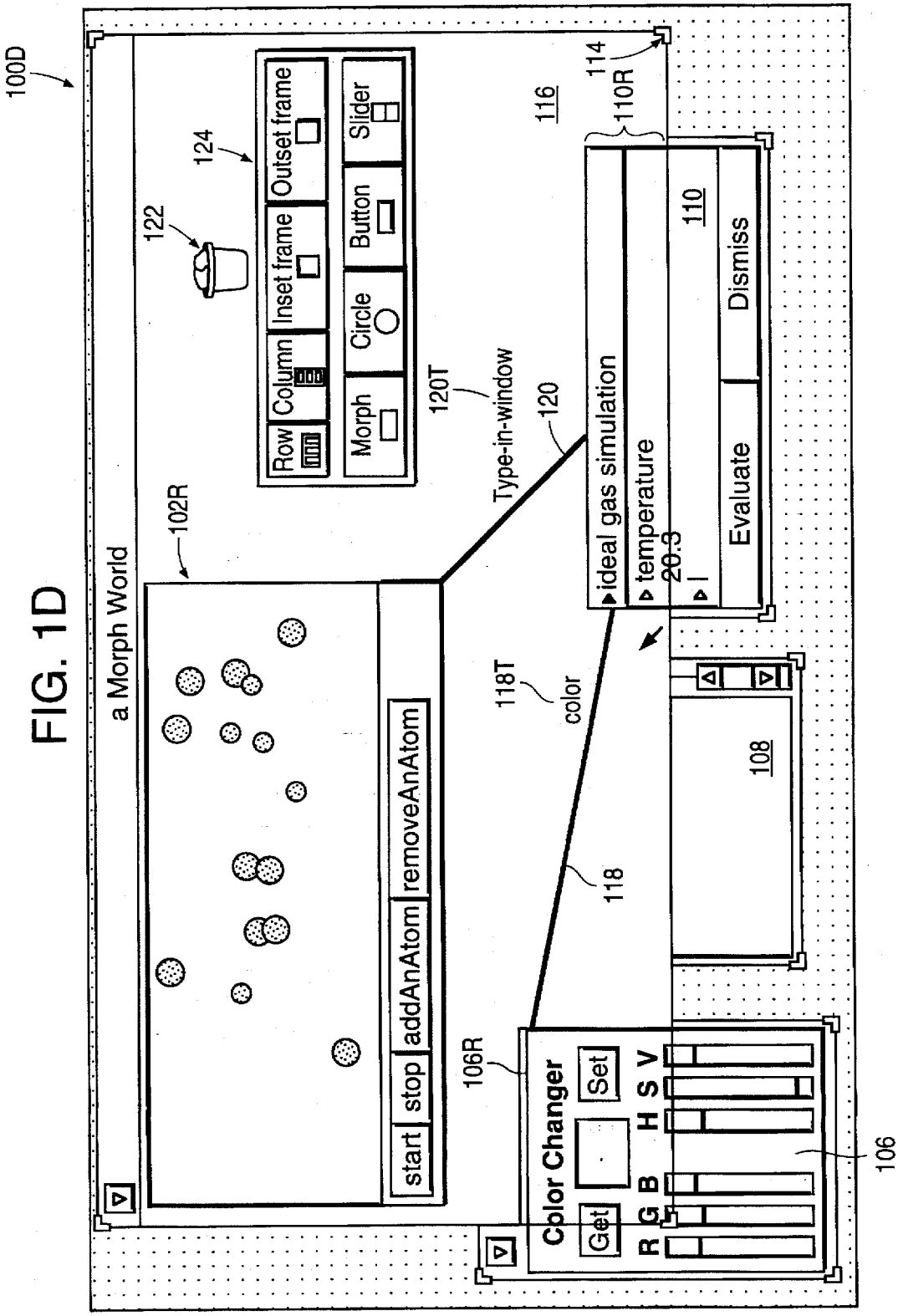
Figure 1E:
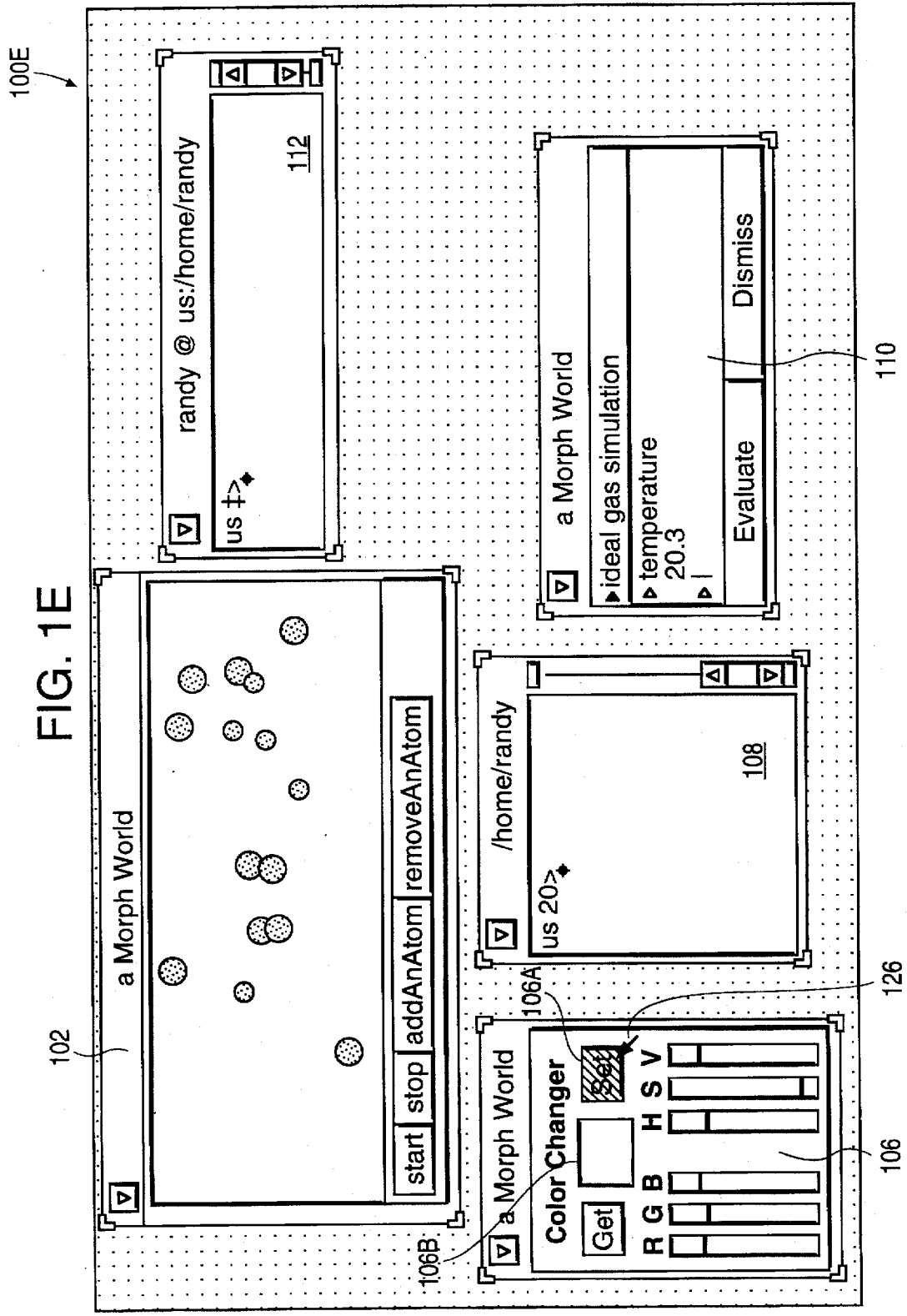

Accordingly, the user selects a view relationships mode in a manner described more completely below and resizes window 102 by dragging a corner 102A of window 102 to a point 114 at which corner 102A is dropped. The user drags and drops corner 102A using a drag-and-drop interface, which is well known in the art of graphical user interfaces. The resizing of a window is described below in greater detail for completeness. The result of such resizing in the view relationships mode is shown as screen view 100B (FIG. 1B).

Window 102 (FIG. 1A) is redrawn as a relationship window 116 (FIG. 1B), which is represented in the rectangular space defined by the user's resizing of window 102 in the view relationships mode. Relationship window 116 includes graphical content 102R, 106R, and 110R, which are copies of graphical content of windows 102, 106 and 110. In an alternative embodiment, graphical content 102R, 106R, and 110OR are included in relationship window 116 by creating within relationship window 116 viewports to windows 102, 106, and 110, respectively. Windows 106 and 110 are related to window 102 and are therefore represented in relationship window 116. Relationship window 116 further includes connections 118 and 120 to represent those relationships. Since windows 108 and 112 are not related to window 102, relationships window 116 does not represent windows 108 and 112. Relationship window 116 overlaps, and therefore occludes, windows 108 and 112. Connection 118 is a line between window 106 and window 102 and therefore indicates to the user that window 106 controls the color of window 102. Text 118T is associated graphically with connection 118 and further clarifies the relationship between windows 106 and 102 to the user. Connection 120 is a line between window 110 and window 102, and text 120T indicates to the user that window 110 is a text-interface window which can be used by the user to manipulate the computer simulation represented graphically within window 102.

Thus, in one fluid and familiar gesture, the user (i) selects window 102, (ii) defines a portion of a computer display device displaying screen view 100A in which to display relationships of window 102, (iii) selects for inclusion in a relationship display windows 106 and 110 which are related to window 102, (iv) causes graphical representations of those relationships to be displayed, and (v) occludes windows 108 and 112, which are not related to window 102 and which overlap the portion of the computer display device defined by the user. The resulting display is clean, clear, and uncluttered. The gesture of the novel user-interface is familiar to the user and provides the user with a powerful tool in managing displays of numerous inter-related graphical objects.

Relationship window 116 also includes icon 122 and tool graphic 124 which provide the user with tools to manipulate the relationships represented in relationship window 116. Icon 122 and tool graphic 124 are generally of the type provided in and used with conventional graphics-based development environments. However, icon 122 and tool graphic 124 exist in the context of relationship windows in general, and specifically in the context of relationship window 116 in this example. Therefore, icon 122 and tool graphic 124 are displayed only in relationship window 116 and are not displayed when relationship window 116 is closed, i.e., redrawn as window 102 (FIG. 1A). As a result, icon 122 (FIG. 1B) and tool graphic 124, which are used as described above to manipulate relationships, are only displayed when relationships are displayed, i.e., when a relationship window such as relationship window 116 is displayed. Otherwise, icon 122 and tool graphic 124 are not displayed and therefore do not clutter the computer display device as extraneous graphical objects.

Screen views 100C and 100D (FIGS. 1C and 1D, respectively) illustrate the manipulation of a relationship in relationship window 116 by the user. The user moves a cursor 126, in a manner described more completely below and using a pointing device, to an end 118B of connection 118, which is the end of connection 118 attached to window 102 in screen view 100B (FIG. 1B). Since end 118B of connection 118 is graphically represented as attached to window 102, end 118B is a graphical association between the relationship represented by connection 118 and window 102. The user actuates the pointing device to select end 118B (FIG. 1C), thereby selecting the association between the relationship represented by connection 118 and window 102, and moves cursor 126 while maintaining the pointing device in an actuated state. Moving a cursor while maintaining a pointing device in an actuated state is commonly known as "dragging." While the pointing device is actuated, end 118B moves with cursor 126. Connection 118 is repeatedly removed from screen view 100C and redrawn in screen view 100C as end 118B moves with cursor 126. The effect of this repeated redrawing is commonly known as "rubberbanding" and provides substantially continuous feedback to the user regarding the state of connection 118 as that state changes in response to the user's manipulation of the pointing device.

The user drags end 118B to a point near graphical content 110R representing window 110 at which point the user deactuates the pointing device. Deactuation of the pointing device disassociates end 118B from cursor 126 such that cursor 126 can be moved without causing a corresponding movement of end 118B. This deactuation and corresponding disassociation is commonly known as "dropping" end 118B. By dropping end 118B near graphical content 110R, the user specifies an association between the relationship represented by connection 118 and window 110 and therefore instructs that the relationship between windows 106 and 102 be severed and that a relationship between windows 106 and 110 be created. In response, such alteration of the relationship represented by connection 118 is effected. The result is illustrated in screen view 100D (FIG. 1D) in which connection 118 is represented as a line between graphical content 106R and 110R of windows 106 and 110, respectively. When a user subsequently actuates a "set" button 106A (FIG. 1E) of window 106 by placing cursor 126 over "set" button 106A and actuating the pointing device, the color specified by the user as controlled by window 106 and shown in viewport 106B of window 106 is assigned to window 110. Window 110 is then redisplayed in that color. Thus, window 106 is now related to window 110.

The resize mechanism described above in the view relationships mode provides the user with a simple, convenient, and intuitive mechanism for viewing and editing relationships between multiple graphical objects displayed simultaneously. The physical components which provide this mechanism are now described more completely.

Structural Components of the Computer System

Figure 2A:
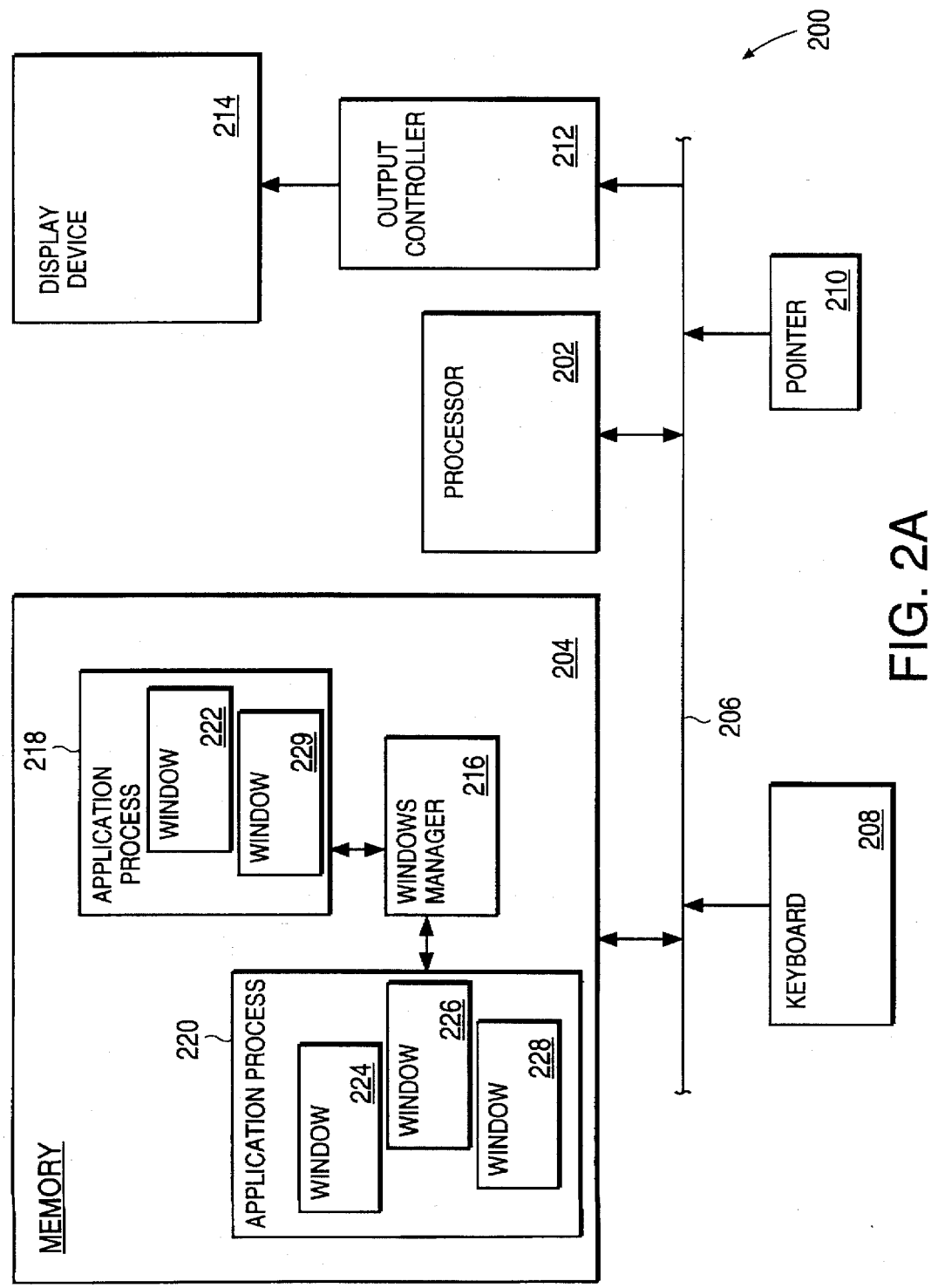
FIG. 2A is a block diagram of a computer system in accordance with the principles of the present invention.

Many computer systems are used today, and most are generally of the composition shown in FIG. 2A. Computer system 200 includes a processor 202 which fetches instructions from a memory 204 through a bus 206 and processes those instructions. Processor 202 can be, for example, the SPARC processor available from Sun Microsystems, Inc. of Mountain View, Calif. Memory 204 can include any type of memory, including without limitation, randomly accessible memory (RAM), read-only memory (ROM), and magnetic storage media such as magnetic tape and disks. In addition to fetching and processing instructions, processor 202 reads data from and writes data to memory 204, receives data and command signals through bus 206 from a keyboard 208 and a pointing device 210, and sends data and commands through bus 206 to an output controller 212. Output controller 212 controls a display device 214 and causes display of data thereon.

Pointing device 210 can be any type of pointing device including, without limitation, an electronic mouse, a trackball, a touch-sensitive pad, a joystick, a digitizing tablet, or a lightpen. Pointing devices and their use are well known but are described here for completeness. Pointing device 210 is used by a user to generate control signals having two or more dimensions and to transmit such signals to processor 202. For example, a user moves an electronic mouse across a substantially flat surface to the left or right to generate control signals in an "X" dimension and forward and backward to generate control signals in a "Y" dimension. Pointing device 210 also includes one or more actuation mechanisms which the user can actuate or deactuate to send further control signals to processor 202. For example, an electronic mouse typically includes one or more buttons, the pressing and releasing of which sends actuation and deactuation signals, respectively, to processor 202.

Control signals received from pointing device 210 are used by processor 202 and output controller 212 to position a cursor, e.g., cursor 126 (FIGS. 1C and 1E), in display device 214. Display device 214 can be any type of computer display device including, without limitation, a cathode ray tube (CRT), a light-emitting diode (LED) screen, or a liquid crystal display (LCD) screen. The cursor is displayed in display device 214 to indicate to the user which position within a display screen of display device 214 is currently specified by the current state of pointing device 210. The user specifies a different point within such a display screen by appropriate manipulation of pointing device 210.

Supporting Components of the User Interface

Three computer processes are shown in FIG. 2A to be executing within computer system 200. Specifically, a windows manager 216 and application processes 218 and 220 are computer processes executing within processor 202 from memory 204. Windows manager 216 maintains records reflecting the state and activity within each of a number of graphical objects displayed in display device 214. For example, if screen view 100A (FIG. 1A) is displayed using display device 214 (FIG. 2A), windows manager 216 maintains records reflecting the state and activity within each of windows 102–112 (FIG. 1A). The state of a window as represented by windows manager 216 (FIG. 2A) includes the position within screen view 100A (FIG. 1A) at which the window is displayed, the relative depth of the window, and the application process which is responsible for the graphical content of the window. The depth of a window indicates to window manager 216 which of two windows occludes the other when the two windows overlap. In general, the window having the greater depth is occluded by the window having the lesser depth. The latter window is displayed "in front of" the former window, and, conversely, the former window is displayed "behind" the latter window. In general, more recently displayed windows are displayed in front of less recently displayed windows.

The contents of each window displayed in display device 214 (FIG. 2A) is the responsibility of a computer process other than windows manager 216. Application process 218 includes window structures 222 and 229, and application process 220 includes window structures 224, 226, and 228. A window structure is a data object representing the state and behavior of a window displayed in display device 214. Data objects are well known and are only briefly described for completeness. A data object includes (i) data which collectively define a state of the data object and (ii) computer instructions which collectively define the behavior of the data object. Window structures such as window structure 224 can be part of an application process such as application process 220 or can be spawned as a separately executing computer process.

Window structures 222, 224, 226, 228, and 229 represent windows 108 (FIG. 1A), 102, 106, 110, and 112, respectively. Windows manager 216 (FIG. 2A) manages user interaction with respect to windows displayed in display device 214 and directs display of those windows in accordance with instructions received from window structures 222, 224, 226, 228, and 229 of application processes 218 and 220. Window structures 222, 224, 226, 228, and 229 receive from windows manager 216 events corresponding to windows displayed in display device 214 and issue instructions to windows manager 216 specifying the graphical content of those windows.

As described above, the relationships corresponding to a particular window are displayed when the particular window is resized in a view relationships mode. Resizing of windows is well-known but is described here for completeness in the context of FIGS. 3A and 3B.

Figure 3A:
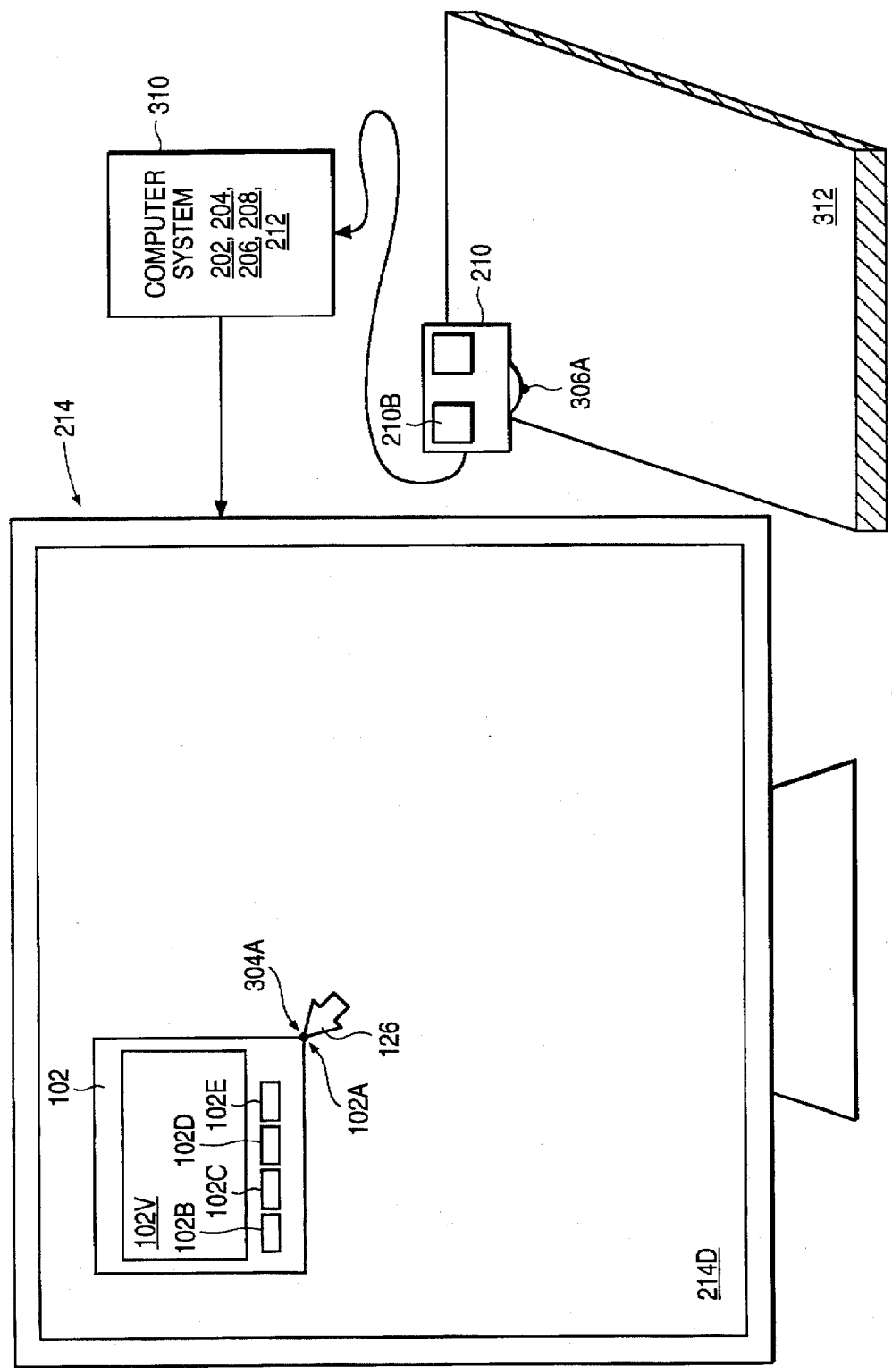
FIGS. 3A and 3B are block diagrams illustrating the resizing of a window in accordance with commands entered by a user.
Figure 3B:
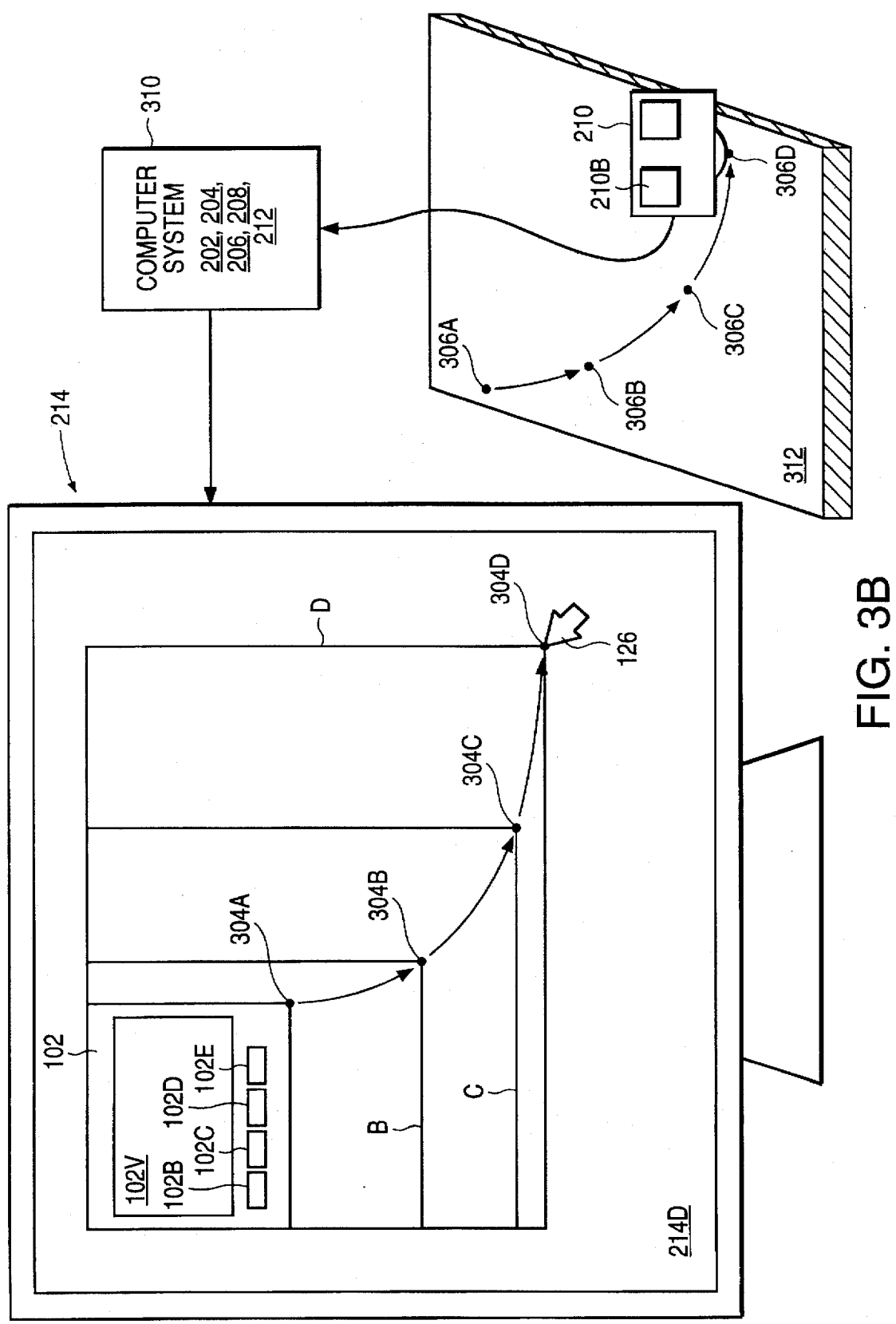

In FIG. 3A, window 102 is displayed in display screen 214D of display device 214. In FIGS. 3A and 3B, display device 214 is controlled by computer system 310, which is computer system 200 (FIG. 2A) excluding display device 214 and pointing device 210, both of which are shown separately in FIGS. 3A and 3B. Cursor 126 is also displayed in display screen 214D and is at position 304A in display screen 214D, which is generally coincident with lower right corner 102A of window 102.

Pointing device 210 includes a button 210B and rests at a position 306A on a work surface 312. The user initiates resizing of window 102 by actuating button 210B on pointing device 210 while cursor 126 is positioned at point 304A and moving pointing device 210 while maintaining pointing device 210 in an actuated state, e.g., by continuously physically holding button 210B in a pressed state. For example, the user physically holds button 210B in a pressed state while physically moving pointing device 210 from point 306A (FIG. 3B), to point 306B, to point 306C, and to point 306D in sequence as shown. Physical movement of pointing device 210 causes signals representing such movement to be transmitted to computer system 310. Those signals are processed by computer system 310 and translated into cursor display commands which are transmitted to display device 214 and which cause corresponding movement of cursor 126 in display screen 214D from point 304A to points 304B, 304C, and 304D in sequence.

Actuation of button 210B by the user causes processor 202 (FIG. 2A) to generate a pointing device event and to transmit data representing the pointing device event to windows manager 216. Windows manager 216 determines that the pointing device event is the result of actuation of button 210B (FIG. 3A) while cursor 126 is positioned at point 304A, which is substantially coincident with corner 102A of window 102. Accordingly, windows manager 216 (FIG. 2A) recognizes the pointing device event as the beginning of a resize event associated with window 102 (FIG. 3A).

Movement of pointing device 210 to points 306B, 306C, and 306D in sequence creates additional pointing device events which are transmitted to windows manager 216 (FIG. 2A). Since windows manager 216 has recognized the beginning of a resize event associated with window 102 (FIG. 3A), windows manager 216 (FIG. 2A) causes display in display screen 214D (FIG. 3B) of a rectangle B when cursor 126 is positioned at point 304B in response to a pointing device event which specifies that pointing device 210 is at point 306B. Rectangle B has as a first corner the upper left corner of window 102 and as a second, opposite corner point 304B and provides to the user feedback regarding the size and position of window 102 which would result from termination of the resize event at the current position of cursor 126. As cursor 126 is moved from point 304B to 304C, windows manager 216 (FIG. 2A) receives additional pointing device events and removes rectangle B (FIG. 3A) from display screen 214D and draws a rectangle C in its place. Rectangle C has as opposite corners the upper left corner of window 102 and point 304C. As cursor 126 is moved from point 304C to 304D, windows manager 216 (FIG. 2A) receives additional pointing device events and removes rectangle C (FIG. 3A) from display screen 214D and draws a rectangle D in its place. Rectangle D has as opposite corners the upper left corner of window 102 and point 304D. Thus, as cursor 126 is moved across display screen 214D in response to physical movement of pointing device 210, windows manager 216 (FIG. 2A) repeatedly draws rectangles in and removes rectangles from display screen 214D (FIG. 3B) to provide substantially immediate feedback to the user regarding the size and position of window 102 which would result from termination of the resize event at the current position of cursor 126. It is appreciated that shapes other than rectangles can be repeatedly removed and redrawn to provide substantially immediate feedback to the user. For example, in resizing a graphical object with a generally circular shape, circles can be repeatedly removed and redrawn to provide substantially immediate feedback to the user regarding the size and position of the resized graphical object.

While pointing device 210 is positioned on work surface 312 at point 306D, the user deactuates pointing device 210, e.g., physically releases button 210B, to terminate the resize event. Deactuation of pointing device 210 by the user causes processor 202 (FIG. 2A) to transmit to windows manager 216 a pointing device event which indicates that pointing device 210 is deactuated. Windows manager 216 recognized deactuation of pointing device 210 as the end of the resize event associated with window 102 (FIG. 3A) and creates a resize event signal representing the resize event. The actuation, movement, and deactuation of pointing device 210 by the user are generally collectively referred to as a gesture of the user.

Figure 2B:
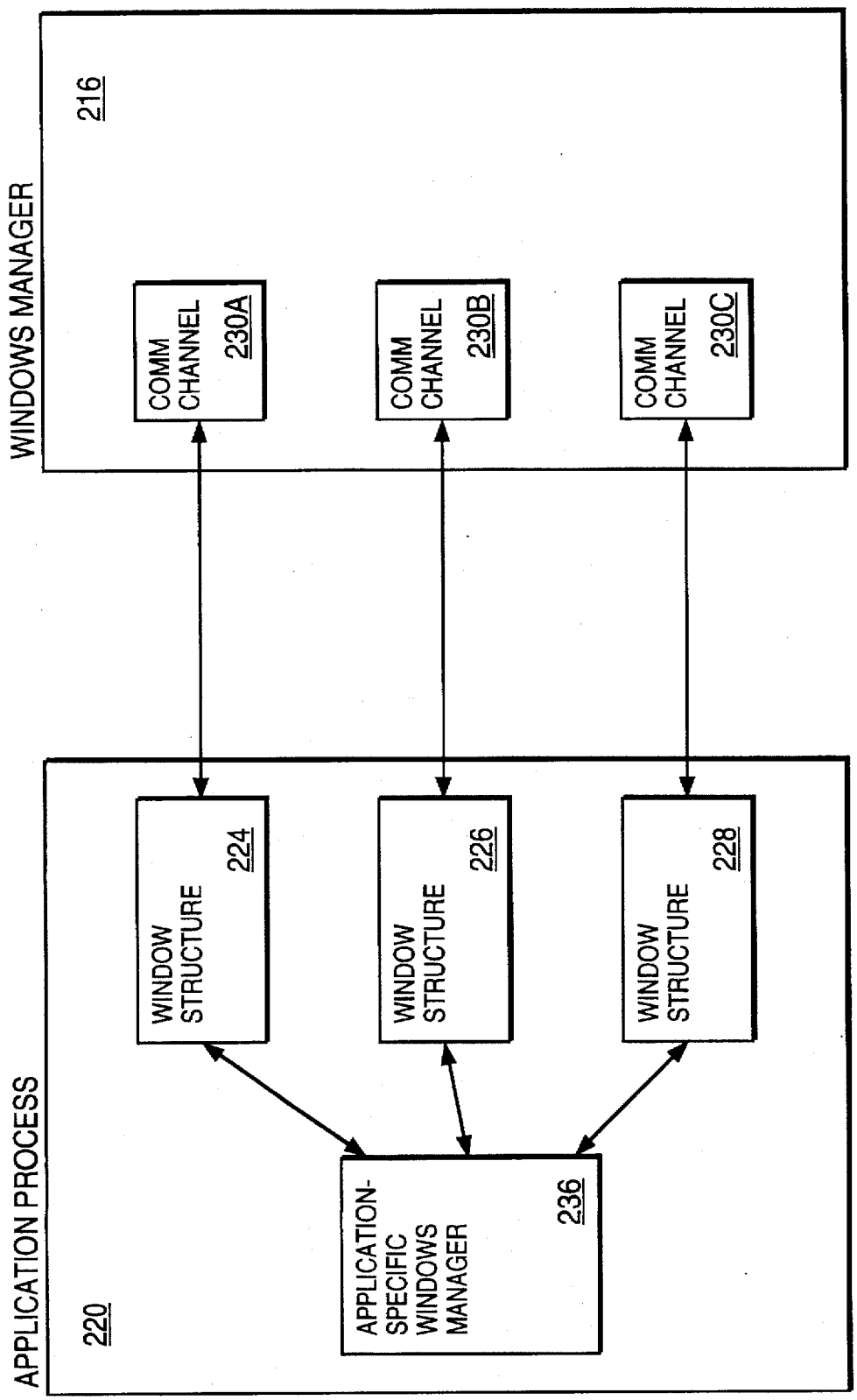
FIG. 2B is a block diagram illustrating in more detail a windows manager and an application process of FIG. 2A.

Window manager 216 (FIG. 2A) transmits the resize event signal to window structure 224 since, in this example, window structure 224 represents window 102 (FIG. 3A). Windows manager 216 (FIG. 2A) communicates with window structure 224 through a communications channel 230A (FIG. 2B) which can be, for example, a portion of memory 204 (FIG. 2A) accessible by both windows manager 216 and window structure 224. The associations between window 102 (FIG. 3A), window structure 224 (FIG. 2B), and communications channel 230A are created when window 102 (FIG. 3A) is first created. The resize event signal transmitted to window structure 224 includes, for example, data specifying point 304D as the new location of the lower right corner of window 102.

Window structure 224 (FIG. 2B) includes a window database 262 (FIG. 2C) which receives the data and recognizes the data as representing a resize event. Window database 262 is a data object within window structure 224 and controls the appearance of window 102 (FIG. 3A). In a normal mode, i.e., when not in the view relationships mode, window database 262 responds in a conventional manner by directing windows manager 216 (FIG. 2B) through communications channel 230A to redraw viewport 102V (FIG. 3B) to substantially fill the new dimensions of window 102 and to redraw buttons 102B-E along the new lower edge of window 102.

View Relationships Mode

Figure 4:
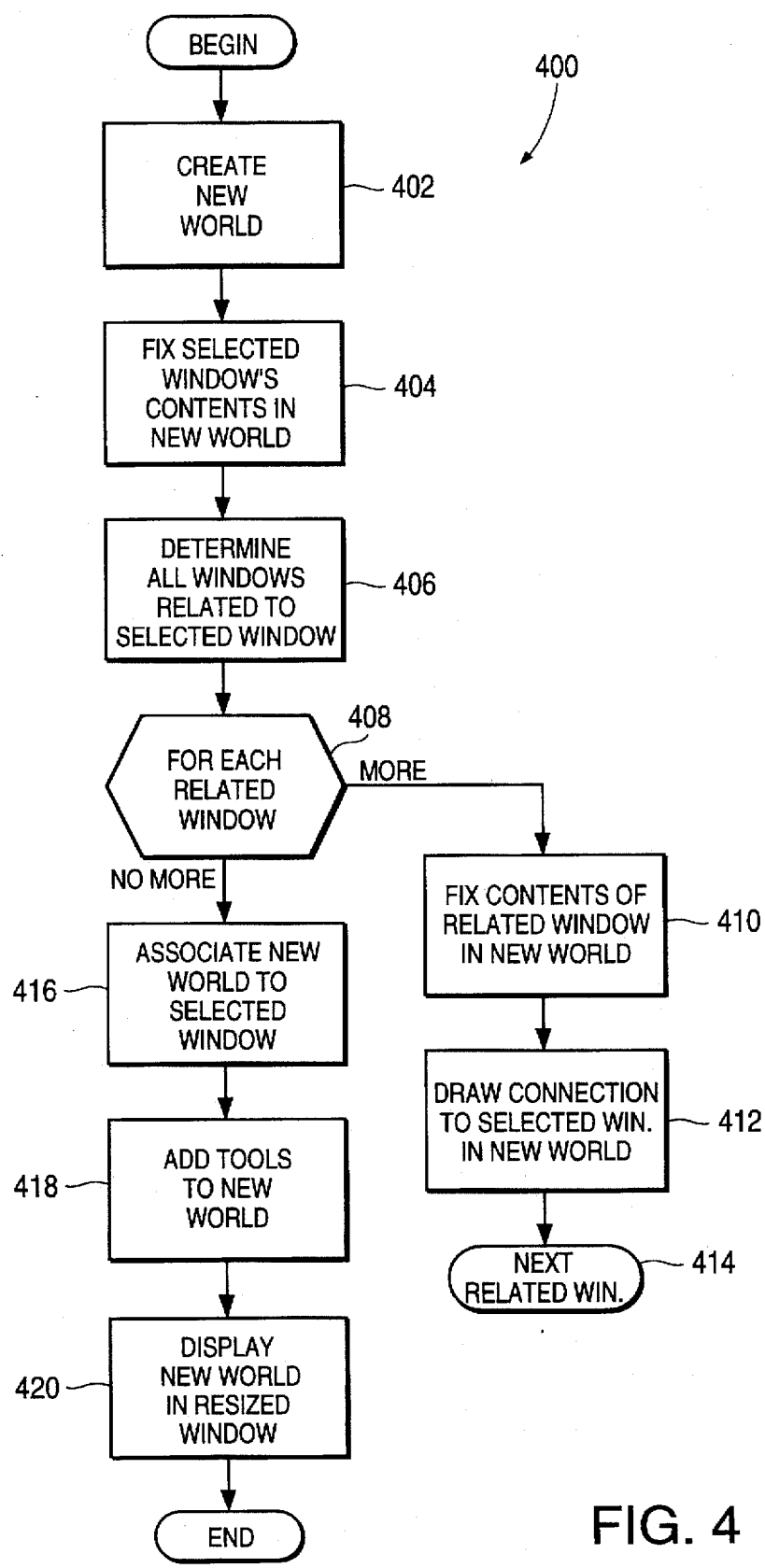
FIG. 4 is a logic flow diagram of the processing of an event in a view relationships mode in accordance with the present invention.

In accordance with the present invention, window structure 224 (FIG. 2B) also operates in a view relationships mode. Window structure 224 (FIG. 2C) includes a mode selector 234, by which the view relationships mode or the normal mode can be selected in accordance with signals generated by the user. Window database 262 queries mode selector 234 as to which of the modes is currently active within window structure 224. Mode selector 234 determines which mode is currently active and responds with data indicating the current mode. Mode selector 234 can determine that window structure 224 is in the view relationships mode in any of a number of ways including, without limitation, determining that a particular key is pressed on keyboard 208 (FIG. 2A) when the resize event signal is received from window manager 216 or querying a flag which is settable by the user in a generally conventional manner to indicate the normal mode or the view relationships mode. When operating in the view relationships mode, window database 262 (FIG. 2C) of window structure 224 transmits data representing the detected resize event to an application-specific windows manager 236, which is sometimes referred to as ASWM 236. As described above with respect to window structure 224, ASWM 236 can be a part of application process 220 or can be spawned as a separate computer process. ASWM 236 processes a resize event, when window structure 224 is in the view relationships mode, in the manner shown in logic flow diagram 400 (FIG. 4).

Processing begins in step 402 in which ASWM 236 (FIG. 2C) creates a new graphics world. The concepts of, and inter-relationships between, graphics worlds, viewports, and windows are well-known and are described only briefly herein for completeness. Generally, a graphics world is a space defined by a corresponding world coordinate system. In windows-based graphical user interfaces, graphics worlds are typically two-dimensional spaces defined by cartesian world coordinate systems. Graphics worlds generally include data specifying graphical objects which are defined in terms of the world coordinate system of the graphics world. A viewport maps a portion of a graphics world to a window, which is generally a partitioned portion of a display screen, e.g., display screen 214D (FIGS. 3A and 3B). ASWM 236 (FIG. 2C) includes a relationship window builder 264 which creates the new graphics world in step 402 (FIG. 4). The new graphics world, e.g., graphics world 502 (FIG. 5), is initially empty, i.e., contains no graphical objects.

Figure 5:
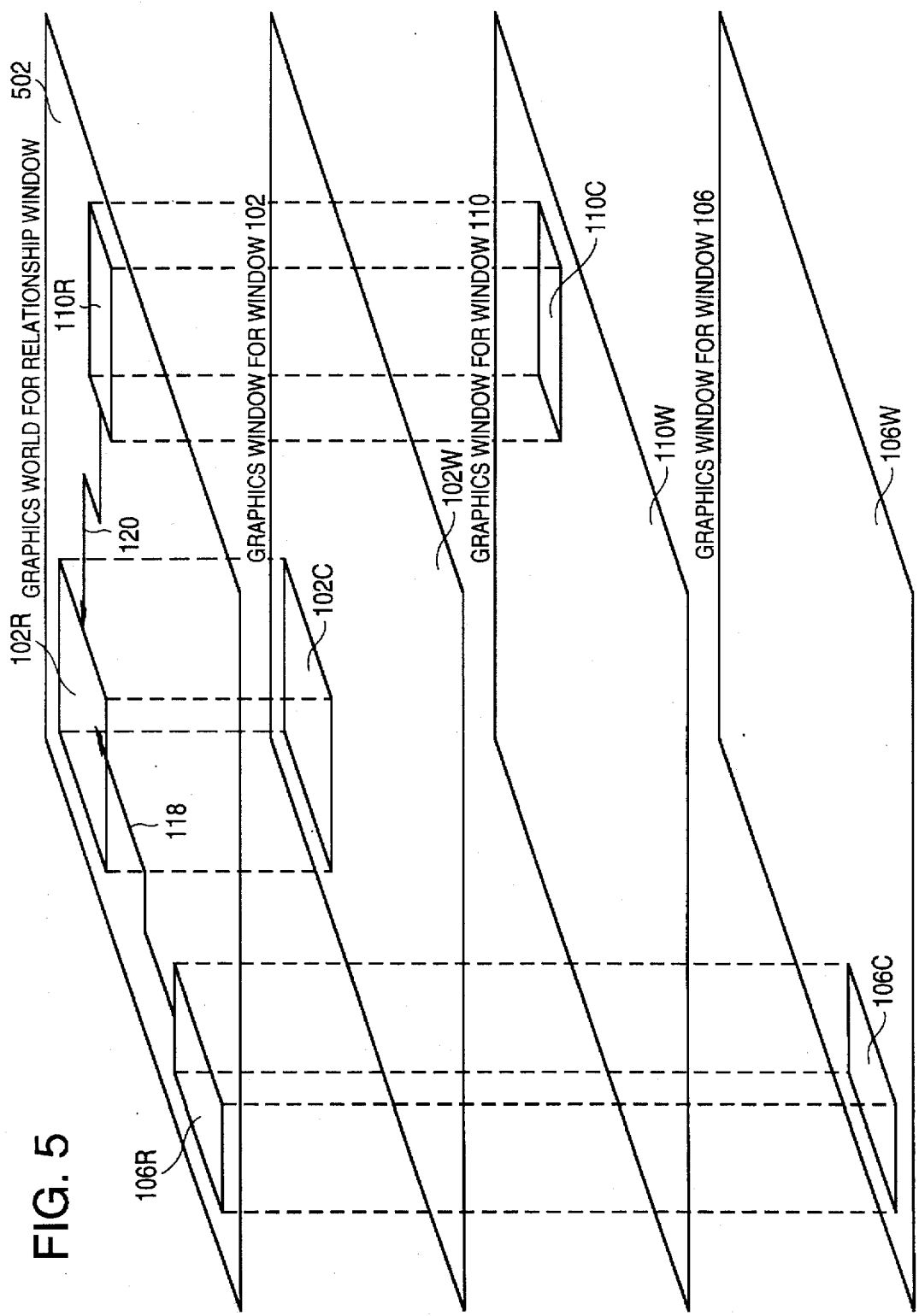
FIG. 5 is a three-dimensional block diagram illustrating inter-relationships between graphics worlds in accordance with processing according to the logic flow diagram of FIG. 4.

Processing transfers from step 402 (FIG. 4) to step 404 in which relationship window builder 264 (FIG. 2C) replicates in graphics world 502 (FIG. 5) graphical content 102C of window 102 (FIG. 1A), thereby representing window 102 in graphics world 502 (FIG. 5). As shown in FIG. 5, graphical content 102C of window 102 (FIG. 1A) are formed in a graphics world 102W (FIG. 5) and are replicated as graphical content 102R in graphics world 502. Alternatively, relationship window builder 264 (FIG. 2C) provides for inclusion of graphical content 102C (FIG. 5) in graphics world 502 by including in graphics world 502 a viewport which maps graphical content 102C of graphics world 102W to graphics world 502. It is preferred that graphical content 102C be represented in a position within graphics world 502 such that display of relationship window 116 (FIG. 1B) displays graphical content 102R in substantially the same place within screen view 100B previously occupied by window 102 (FIG. 1A). As a result, the user naturally identifies graphical content 102R with window 102 (FIG. 1A), which appears to show through relationship window 116 but is actually occluded by relationship window 116. From step 404 (FIG. 4), processing transfers to step 406.

In step 406, ASWM 236 (FIG. 2C) determines which of the graphical objects represented by structures associated with application process 220 are related to the selected graphical object, e.g., window 102 (FIG. 1A). Window 102 is the selected graphical object since, by resizing window 102, the user has selected window 102 as the graphical object whose relationships are of interest. It is appreciated that it is unnecessary to limit the scope of inquiry to graphical objects represented by structures associated with application process 220 (FIG. 2A) and that the inquiry regarding related graphical objects can include examination of graphical objects represented by structures associated with application processes other than application process 220. However, in many windows-based computing environments, only graphical objects represented by structures associated with a common application process can be related. In such environments, limiting the inquiry regarding related graphical objects to those represented by structures associated with application process 220 provides a simple and efficient screening mechanism to quickly eliminate from consideration many graphical objects which are not related to window 102 (FIG. 1A).

Collecting Relationships

In determining which graphical objects are related to window 102, ASWM 236 (FIG. 2C) can look for any of a number of types of relationships. For example, ASWM 236 can determine which graphical objects are related to window 102 (FIG. 1A) by determining (i) which graphical objects are affected by window 102, (ii) which graphical objects affect window 102, or (iii) which graphical objects either affect or are affected by window 102. Furthermore, ASWM 236 (FIG. 2C) can include only direct relationships or can also include indirect relationships. A relationship between a first graphical object and a second graphical object is indirect if the first graphical object affects a third graphical object which in turn affects the second graphical object. A relationship between the first and second graphical objects is direct if the first graphical object affects the second graphical object directly, i.e., without affecting a third, intermediate graphical object. It should be noted that representing all direct and indirect relationships between the selected graphical object, e.g., window 102, and all graphical objects which affect or are affected by window 102 approaches the "ball of spaghetti" displays described above. It is therefore preferred that only direct relationships be shown in relationship window 116 (FIG. 1B). If the user determines, after seeing relationship window 116, that the user would like to see relationships involving window 106, for example, the user can simply, easily, and intuitively resize window 106 in the view relationships mode to see those relationships.

ASWM 236 (FIG. 2C) includes a relationship filter 260. ASWM 236 determines which graphical objects are related to the selected graphical object, e.g., window 102 (FIG. 5) as follows. Relationship filter 260 queries each structure associated with application process 220 which represents a graphical object displayed in display device 214 (FIG. 2A), specifying the graphical object of interest, e.g., window 102 (FIG. 1A), and the type or types of relationship of interest. For example, relationship filter 260 (FIG. 2C) queries each of window structures 226 and 228 regarding whether windows 106 and 110, respectively, directly affect window 102. Each of window structures 226 and 228 is directly analogous to window structure 224 as described above and includes a respective window database which is directly analogous to window database 262 of window structure 224. Window structures 226 and 228 respond with data specifying whether, and if so, how, windows 106 and 110, respectively, are related to the specified graphical object. The following example illustrates how each of window structures 226 and 228 determine if and how windows 106 (FIG. 1A) and 110, respectively, are related to window 102.

Recognizing Relationships

Figure 6:
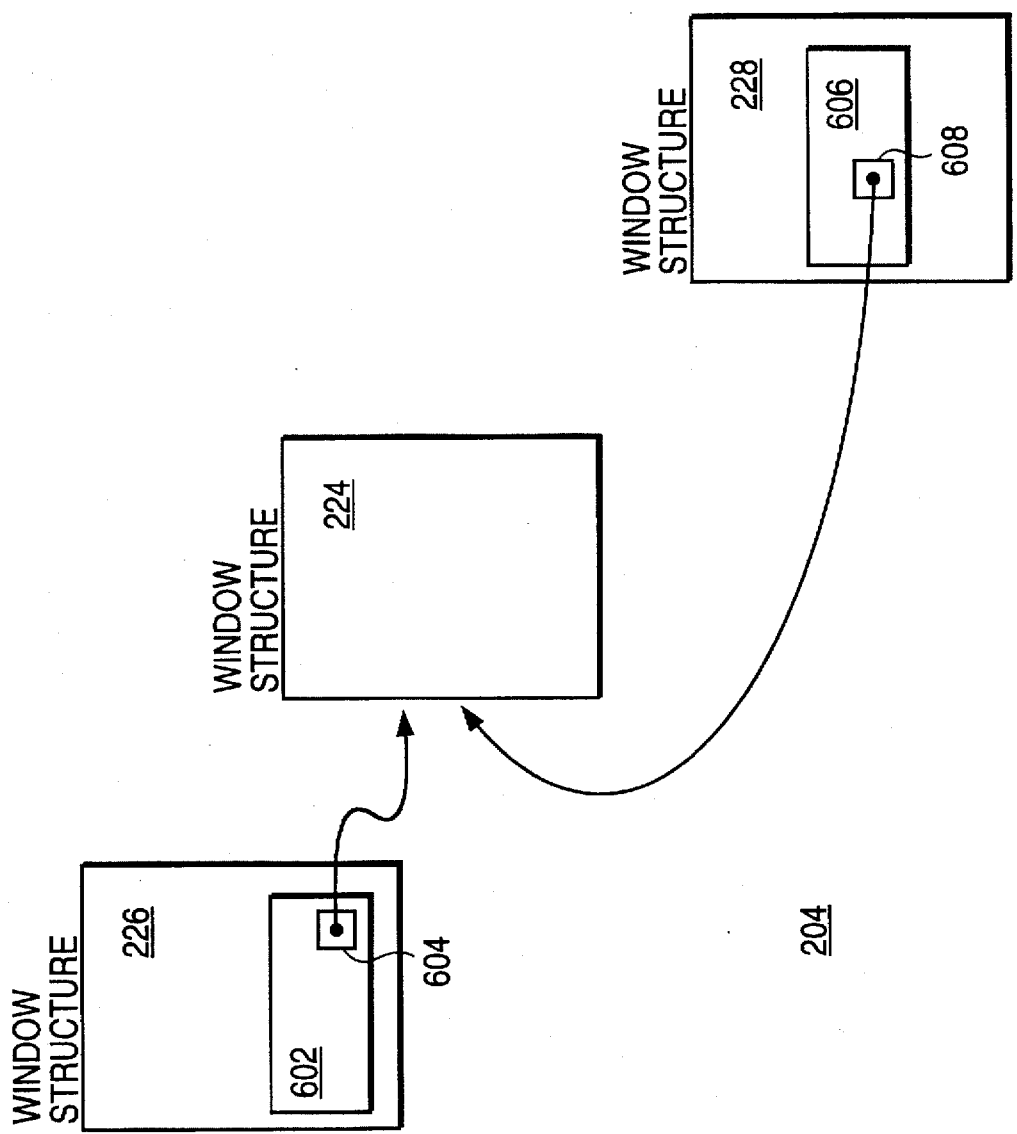
FIG. 6 and 7 are block diagrams illustrating inter-relationships between windows of FIGS. 1A–E in the form of references included in window structures representing those windows in a memory of a computer system.

FIG. 6 shows window structures 224, 226, and 228 in greater detail. Window structure 226 determines whether window 106 is related to window 102 (FIG. 1A) by determining whether window structure 226 includes one or more references to window structure 224. For example, window structure 226 includes a procedure 602, execution of which causes the color of window 102 (FIG. 1A) to be changed by directing window structure 224 (FIG. 6) to record as the color of window 102 a specified color. Accordingly, procedure 602 includes a reference 604 to window structure 224 so that window structure 224 can be so directed. By detecting reference 604 within window structure 226, window structure 226 determines that window 106 (FIG. 1A) affects window 102 and is therefore related to window 102.

Window structure 226 can determine whether a reference to window structure 224 is included in window structure 226 by any of a number of mechanisms. Window structure 226 can search all computer instructions contained within window structure 226 for any computer instructions including a reference to window structure 224. Alternatively, and preferably, window structure 226 maintains a list of window structures referenced by window structure 226. Window structure 226 includes in such a list data specifying the nature of the relationship between the referenced window structures and window structure 226.

Window structure 226 (FIG. 2C) responds to the inquiry by relationship filter 260 with data indicating that window 106 (FIG. 1A) is related to window 102 and specifying the nature of the relationship, e.g., that window 106 directly controls the color of window 102.

Similarly, window structure 228 (FIG. 6) includes a procedure 606, execution of which queries or sets various parameters within window structure 224 which in turn define the ideal gas simulation represented within window 102 (FIG. 1A) in accordance with command signals entered by the user in the text-interface of window 110. Accordingly, procedure 606 (FIG. 6) includes a reference 608 to window structure 224. Window structure 228 therefore determines, in a manner directly analogous to that described above with respect to window structure 226, that window 110 (FIG. 1A) is related to window 102 and responds to relationship filter 260 (FIG. 2C) with data indicating that window 110 (FIG. 1A) is related to window 102.

Figure 7:
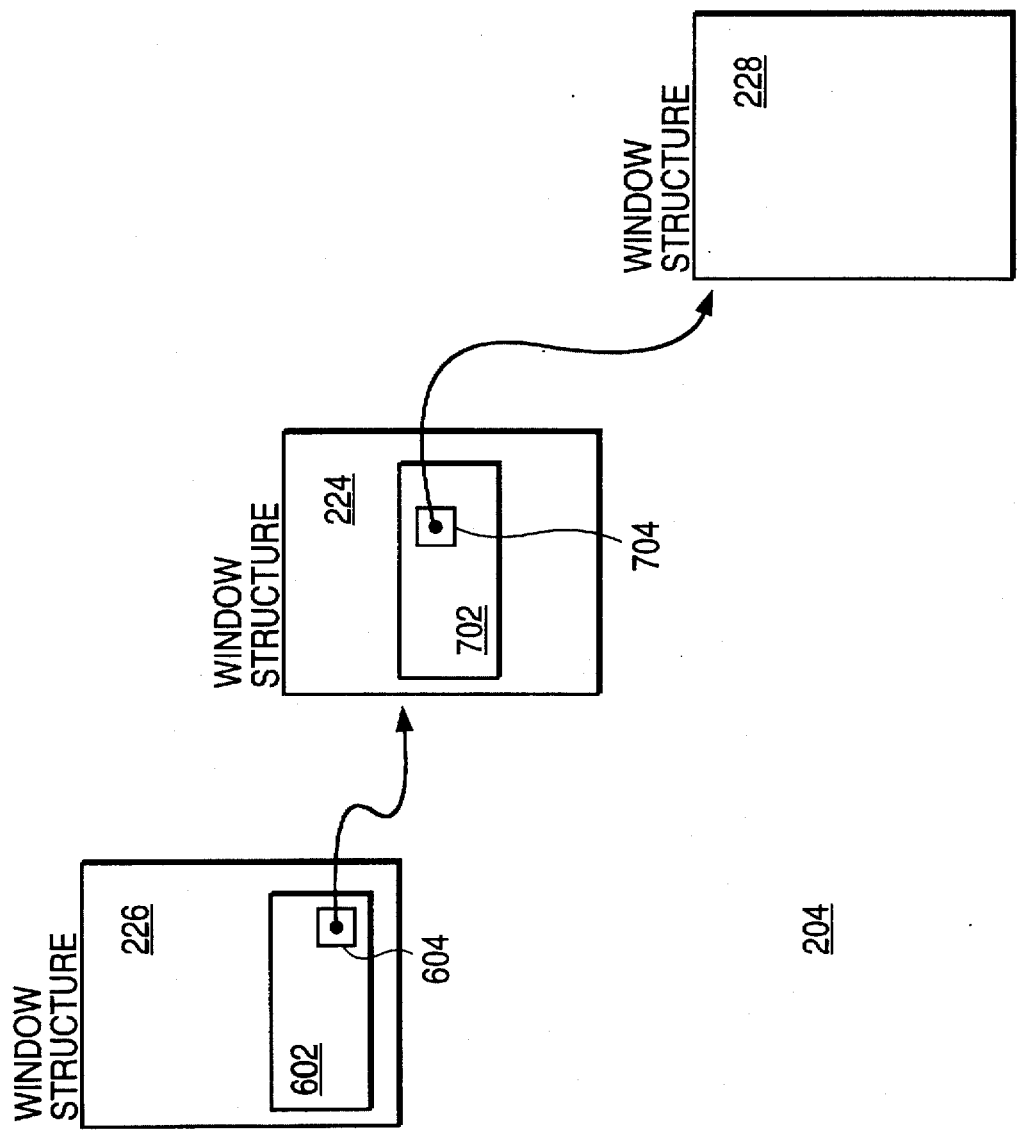

If relationship filter 260 (FIG. 2C) includes graphical objects affected by window 102 as graphical objects related to window 102, relationship filter 260 (FIG. 2C) queries window structure 224 for data specifying which graphical objects, if any, are affected by window 102. As shown in FIG. 7, window structure 224 can include references to structures representing other graphical objects. For example, window structure 224 includes a procedure 702, execution of which passes to window structure 228 data to be displayed to the user through the text-interface of window 110 (FIG. 1A). Accordingly, procedure 702 (FIG. 7) includes a reference 704 to window structure 228. By detecting reference 704 within window structure 224, window structure 224 determines that window 102 (FIG. 1A) affects window 110 which is therefore related to window 102. Window 110 therefore has a relationship with window 102, and the relationship is defined by window structure 224 (FIG. 7), which defines the state and behavior of window 102 (FIG. 1A) as described above.

Representing the Relationships

Once relationship filter 260 (FIG. 2C) has determined which graphical objects are related to the selected graphical object, e.g., window 102 (FIG. 1A), in step 406 (FIG. 4), data specifying those graphical objects and the nature of those relationships are transmitted to relationship window builder 264 (FIG. 2C) and processing transfers to loop step 408 (FIG. 4). Loop step 408 and next step 414 collectively define a loop in which each of the graphical objects related to the selected graphical object are processed according to steps 410 and 412 which are described below. Once each related graphical object has been processed according to steps 410 and 412, processing transfers from loop step 408 to step 416. During each iteration of the loop defined by loop step 408 and next step 414, the related graphical object processed in that iteration is called the subject graphical object.

In step 410, relationship window builder 264 (FIG. 2C) represents the subject graphical object in graphics world 502 (FIG. 5). Relationship window builder 264 (FIG. 2C) queries the structure representing the subject graphical object for the graphical content of the subject graphical object. The queried structure responds by supplying such graphical content to relationship window builder 264. Once the graphical content of the subject graphical object has been retrieved from the queried structure, relationship window builder 264 replicates the graphical content in graphics world 502 (FIG. 5). For example, graphical content 106C of window 106 (FIG. 1A), which is formed in graphics world 106W (FIG. 5), is replicated as graphical content 106R in graphics world 502. Similarly, in a separate performance of step 410 in which window 110 (FIG. 1A) is the subject graphical object, graphical content 110C (FIG. 5) of window 110 (FIG. 1A), which is formed in graphics world 110W (FIG. 5), is replicated as graphical content 110R in graphics world 502. In an alternative embodiment, graphical content 106C and 110C is included in graphics world 502 by creating in graphics world 502 two viewports which are mapped to graphical content 106C and 110C, respectively, of graphics worlds 106W and 110W, respectively. By including in graphics world 502 viewports mapped to graphical content 106C and 110C, display in computer display device 214 (FIG. 2A) of a portion of graphics world 502 (FIG. 5) which includes any part of those viewports causes display of corresponding portions of graphical content 106C and 110C by conventional operation of known viewport mechanisms.

As described above with respect to graphical content 102C, it is preferred that graphical content 106C and 110C be included, either as replicated or by inclusion of a corresponding viewport, in a position within graphics world 502 such that display of relationships window 116 (FIG. 1B) displays graphical content 106R and 110R in substantially the same place within screen view 100B previously occupied by windows 106 (FIG. 1A) and 110, respectively. As a result, the user naturally identifies graphical content 106R and 110R with windows 106 (FIG. 1A) and 110, respectively, since windows 106 and 110 appear not to be occluded while other windows which overlap relationship window 116, e.g., window 108 and 112, are occluded. However, as described above, windows 106 and 110 are, in actuality, partly occluded by relationships window 116 (FIG. 1B).

From step 410 (FIG. 4), processing transfers to step 412 in which relationship window builder 264 (FIG. 2C) represents graphically within graphics world 502 (FIG. 5) the relationship between the subject graphical object and the selected window. Relationship window builder 264 (FIG. 2C) includes a connection builder 268 which generates graphical representations of relationships between respective graphical objects. For example, in the iteration in which window 106 is the subject graphical object, connection builder 268 (FIG. 2C) generates connection 118 (FIG. 5) and relationship window builder 264 (FIG. 2C) includes connection 118 (FIG. 5) in graphics world 502 to graphically represent that window 106 affects window 102. In a separate performance of step 412 (FIG. 4), connection builder 268 (FIG. 2C) generates connection 120 (FIG. 5) and relationship window builder 264 (FIG. 2C) includes connection 120 (FIG. 5) in graphics world 502 to graphically represent that window 110 is affected by window 102. From step 412 (FIG. 4), processing transfers to next step 414 through which processing transfers to loop step 408 and the next related graphical object is processed according to the loop defined by loop step 408 and next step 414. As described above, processing transfers to step 416 when all related graphical objects have been processed according to the loop of steps 408–414.

In step 416, relationship window builder 264 (FIG. 2C) maps graphics world 502 (FIG. 5) to window 102 (FIG. 1A) as resized to form relationship window 116 (FIG. 1B). It is preferred that graphics world 502 (FIG. 6) is mapped such that display of relationship window 116 (FIG. 1B) in the rectangular area defined by the resize event as described above displays graphical content 102R, 106R and 110R of graphics world 502 (FIG. 5) in substantially the same place within screen view 100B (FIG. 1B) previously occupied by windows 102 (FIG. 1A), 106, and 110, respectively. Processing transfers from step 416 (FIG. 4) to step 418.

Tools for Manipulating Relationships

Relationship window builder 264 (FIG. 2C) includes a tool builder 266. In step 418, tool builder 266 (FIG. 2C) includes in graphics world 502 (FIG. 5) icon 122 and tool graphic 124 and associates with icon 122 and tool graphic 124 various procedures for carrying out the tasks which are invoked by user activation of icon 122 or the various tools represented in tool graphic 124. Processing transfers from step 418 (FIG. 4) to step 420 in which ASWM 236 (FIG. 2C) transmits graphics world 502 (FIG. 5) to window structure 224 for display in computer display 214 (FIG. 2A) as the graphical contents of relationship window 116 (FIG. 1B). Window structure 224 (FIG. 2B) issues command signals to windows manager 216 which direct windows manager 216 to display the contents of graphics world 502 (FIG. 5) in the rectangular area of display screen 100B (FIG. 1B) specified in the resize event to thereby form relationship window 116. Relationship window 116 is associated to communication channel 230A (FIG. 2B) and therethrough to window structure 224 within windows manager 216. Therefore, from the perspective of windows manager 216, relationship window 116 (FIG. 1B) is the same window as window 102 (FIG. 1A) notwithstanding the different graphical content and appearance of relationship window 116 (FIG. 1B). Displaying relationship window 116 occludes any graphical objects not related to the selected window to the extent those unrelated graphical objects overlap relationship window 116 since such graphical objects are not represented in relationships window 116. After step 420 (FIG. 4), processing according to logic flow diagram 400 terminates.

Thus, when the user resizes a window in the view relationships mode, the window as resized and as displayed on display device 214 (FIG. 2) occludes graphical objects which are not related to the resized window to the extent those graphical objects overlap the resized window and represents graphically the relationships between the resized window and graphical objects related to the resized window.

The above description is illustrative only and is not limiting. For example, it is described above that graphics world 502 (FIG. 5) is created in response to a resize event associated with window 102 (FIG. 1A) when window 102 is in a view relationships mode. However, it is appreciated that graphics world 502 (FIG. 5) can be created when window 102 (FIG. 1A) is created and can be continually updated as graphical objects which are related to window 102 are created or modified. In such an embodiment, resizing window 102 in the view relationships mode causes graphics world 502 (FIG. 5) to be mapped to window 102 (FIG. 1A) in place of graphics world 102W (FIG. 5) which is ordinarily mapped to window 102 (FIG. 1A).

Furthermore, it is described above that window 102 (FIG. 1A) is redrawn as relationship window 116 (FIG. 1B) in response to a resize event in the view relationships mode. However, it is appreciated that other events can be used to trigger display of window 102 as relationship window 116. For example, in some windows-based user-interfaces, a maximize event associated with window 102 (FIG. 1A) causes window 102 to be changed in size and position so as to fill substantially the entirety of screen view 100A. In the view relationships mode, a maximize event associated window 102 causes window 102 to be redrawn as relationship window 116 (FIG. 1B) in substantially the entirety of screen view 100B. Alternatively, the user can issue a command which causes graphics world 502 (FIG. 5) to be mapped to window 102 (FIG. 1A) without changing the size of window 102 or the position within screen view 100A at which window 102 is displayed. In such an embodiment, graphics world 502 (FIG. 5) is mapped to window 102 such that graphical content 102R, 106R, and 110R are displayed in window 102 (FIG. 1A) in miniature form such relationships involving window 102 can be graphically represented within window 102 without changing the size or position of window 102.

It is further appreciated that, rather than redrawing window 102 (FIG. 1A) as relationship window 116 (FIG. 1B) as described above, relationship window 116 can be an entirely different window drawn over window 102 (FIG. 1A) in response to the resize event in the view relationship mode without deviating from the general principles of the present invention. In addition, in the view relationships mode, an event associated with a graphical object other than a window, e.g., an icon or a graphical object displayed within a window, causes a relationship window in which relationships involving that graphical object are represented to be displayed.

Accordingly, the present invention is limited only by the claims which follow.

What is claimed is:

1. A method for representing relationships between two or more graphical objects displayed in a computer display device of a computer system which includes a processor, memory and the computer display device, the method comprising:

(a) detecting a resize event which is associated with a first one of the graphical objects displayed in the computer display device and which is generated in response to user manipulation of a computer input device in a resize gesture;

(b) determining that the first graphical object is in a view relationships mode which indicates that the resize gesture is to be interpreted as a view relationships gesture;

(c) representing the first graphical object in a graphics world in the memory;

(d) determining that one or more related ones of the graphical objects displayed in the computer display device are related to the first graphical object by reference to data stored in the memory of the computer system which represents relationships between the graphical objects displayed in the computer display device;

(e) for each related graphical object, performing the following steps;
 (i) representing the related graphical object in the graphics world; and
 (ii) representing in the graphics world the relationship between the related graphical object and the first graphical object;

(f) associating the graphics world with a relationship window; and (g) displaying the relationship window in the computer display device to thereby cause display in the computer display device of the representations of the first graphical object, of each related graphical object, and of the relationship between each related graphical object and the first graphical object.

2. The method of claim 1 wherein the first graphical object is represented in the graphics world such that display of the relationship window in the computer display device represented the first graphical object in substantially the same place at which the first graphical object is displayed in the computer display device prior to displaying the relationship window.

3. The method of claim 1 wherein each of the related graphical objects is represented in the graphics world such that display of the relationship window in the computer display device represented each of the related graphical objects in substantially the same place at which each of the related graphical objects is respectively displayed in the computer display device prior to displaying the relationship window.

4. The method of claim 1 further comprising:
altering the relationship between the first graphical object and a selected one of the related graphical objects in response to signals generated by a user.

5. The method of claim 4 wherein the signals include identification of a graphical representation of the relationship in the relationship window.

6. The method of claim 4 wherein the signals include identification of an association in the relationship window between a graphical representation of the relationship and an associated graphical object, which is either the first graphical object or the selected related graphical object.

7. The method of claim 6 wherein the signals further include specification of a new association between the representation of the relationship and a designated one of the graphical objects, which is different than the associated graphical object.

8. A method for representing relationships between two or more graphical objects displayed in a computer display device of a computer system which includes a processor, memory and the computer display device, the method comprising:
detecting an event which is associated with a first one of the graphical objects;
determining that the event occurred in a view relationships mode;
displaying in the computer display device a relationship window, the step of displaying comprising:
 representing the first graphical object in the relationship window;
 representing each of the graphical objects related to the first graphical object in the relationship window; and
 representing in the relationship window relationships between the first graphical object and each of the graphical objects related to the first graphical objects.

9. The method of claim 8 wherein the first graphical object is represented within the relationship window in substantially the same position within the computer display device at which the first graphical object is displayed.

10. The method of claim 8 wherein each of the graphical objects related to the first graphical object is represented within the relationship window in substantially the same respective position within the computer display device at which each of the graphical objects related to the first graphical object is displayed.

11. The method of claim 8 wherein the event is a resize event.

12. The method of claim 8 further comprising:
altering a relationship between the first graphical object and a second one of the graphical objects in response to signals generated by a user.

13. The method of claim 12 wherein the signals include identification of a representation of the relationship in the relationship window.

14. The method of claim 12 wherein the signals include identification of an association in the relationship window between a representation of the relationship and an associated graphical object, which is either of the first and second graphical objects.

15. The method of claim 14 wherein the signals further include specification of a new association between the representation of the relationship and a selected graphical object, which is different than the associated graphical object.

16. A method for representing relationships between two or more graphical objects displayed in a computer display device, the method comprising:
representing in a relationship window a first one of the graphical objects;
representing in the relationship window a second one of the graphical objects, which has a relationship to the first graphical object;
representing the relationship in the relationship window;
excluding from the relationship window all of the graphical objects which are not related to the first graphical object; and
displaying the relationship window in the computer display device in response to a user-initiated event associated with the first graphical object.

17. The method of claim 16 wherein the relationship is defined within a structure representing the first graphical object.

18. The method of claim 16 wherein the relationship is defined within a structure representing the second graphical object.

19. The method of claim 16 wherein the event is a resize event.

20. The method of claim 16 wherein the step of representing the first graphical object comprises representing the first graphical object in the relationship window such that displaying the relationship window displays the representation of the first graphical object in substantially the same place at which the first graphical object is displayed in the computer display device.

21. The method of claim 16 wherein the step of representing the second graphical object comprises representing the second graphical object in the relationship window such that displaying the relationship window displays the representation of the second graphical object in substantially the same place at which the second graphical object is displayed in the computer display device.

22. The method of claim 16 further comprising:
altering the relationship between the first graphical object and the second graphical object in response to signals generated by a user.

23. The method of claim 22 wherein the signals include identification of a representation of the relationship in the relationship window.

24. The method of claim 22 wherein the signals include identification of an association in the relationship window between the representation of the relationship and an associated graphical object, which is either of the first and second graphical objects.

25. The method of claim 24 wherein the signals further include specification of a new association between the representation of the relationship and a selected graphical object, which is different than the associated graphical object.

26. An apparatus for representing relationships between two or more graphical objects displayed in a computer display device of a computer system which includes a processor, memory, a user input device, and the computer display device, the apparatus comprising:
means for detecting signals from the user input device which represent an event wherein the event is associated with a first one of the graphical objects;
means for determining that the event occurred in a view relationships mode;
means for displaying a relationship window in the computer display device, the relationship window comprising:
representation of the first graphical object;
representation of one or more selected ones of the graphical objects which are related to the first graphical object; and
representation of relationships between the first graphical object and the selected graphical objects.

27. An apparatus for displaying relationships between two or more graphical objects displayed in a computer display device, the apparatus comprising:
an event detector;
a mode selector;
a windows database, operatively coupled between the event detector and the mode selector, for receiving from the event detector event signals which indicate that an event associated with a first one of the graphical objects has occurred and for querying the mode selector to determine that the event occurred while a view relationships mode is selected within the mode selector;
one or more graphical object databases for storing relationship and content data for each of the graphical objects;
a relationship filter, operatively coupled to the means for receiving event signals and to the one or more graphical object databases, for retrieving from the graphical object databases relationships involving the first graphical object; and
a relationship window builder, operatively coupled to the relationship filter and the graphical object databases, (i) for representing in a relationship window the first graphical object and one or more related ones of the graphical objects, which are related to the first graphical object according to the relationships retrieved by the relationship filter and (ii) for representing in the relationship window the relationships retrieved by the relationship filter.

28. The apparatus of claim 27 wherein the relationship window builder comprises a display request generator for requesting display of the relationship window in the computer display device.

29. The apparatus of claim 28 wherein the relationship window builder further comprises a relationship tool builder for including in the relationship window tools which provide a mechanism by which a user can enter relationship alteration commands.

30. The apparatus of claim 29 wherein the relationship builder alters, in response to relationship alteration commands, one or more of the relationships represented in the relationship window.

31. A computer system comprising:
a processor,
memory operatively coupled to the processor,
a user input device operatively coupled to the processor,
a computer display device operatively coupled to the processor, and
an apparatus, operatively coupled to the processor, for displaying relationships between two or more graphical objects displayed in the computer display device, the apparatus comprising:
an event detector;
a mode selector;
means, operatively coupled between the event detector and the mode selector, for receiving from the event detector event signals which indicate that an event associated with a first one of the graphical objects has occurred and for querying the mode selector to determine that the event occurred while a view relationships mode is selected within the mode selector;
one or more graphical object databases for storing relationship and content data for each of the graphical objects;
a relationship filter, operatively coupled to the means for receiving event signals and to the one or more graphical object databases, for retrieving from the graphical object databases relationships involving the first graphical object; and
a relationship window builder, operatively coupled to the relationship filter and the graphical objects database, (i) for representing in a relationship window the first graphical object and one or more related ones of the graphical objects, which are related to the first graphical object according to the relationships retrieved by the relationship filter, and (ii) for representing in the relationship window the relationships retrieved by the relationship filter.

32. The computer system of claim 31 wherein the relationship window builder comprises a display request generator for requesting display of the relationship window in the computer display device.

33. The computer system of claim 32 wherein the relationship window builder further comprises a relationship tool builder for including in the relationship window tools which provide a mechanism by which a user can enter relationship alteration commands.

34. The computer system of claim 33 wherein the relationship builder alters, in response to relationship alteration commands, one or more of the relationships represented in the relationship window.

35. A computer-readable memory which, when executed in a computer processor, represents relationships between two or more graphical objects displayed in a computer display device of a computer system which includes the computer processor, the memory, a user input device, and the computer display device, the memory comprising:

computer instructions configured to detect signals from the user input device which represent an event wherein the event is associated with a first one of the graphical objects;

computer instructions configured to determine that the event occurred in a view relationships mode;

computer instructions configured to display a relationship window in the computer display device, the relationship window comprising:

representation of the first graphical object;

representation of one or more selected ones of the graphical objects which are related to the first graphical object; and representation of relationships between the first graphical object and the selected graphical objects.

36. A computer-readable memory which, when executed in a computer processor, displays relationships between two or more graphical objects displayed in a computer display device, the memory comprising:

an event detector;

a mode selector;

a graphical object manager, operatively coupled between the event detector and the mode selector, for receiving from the event detector event signals which indicate that an event associated with a first one of the graphical objects has occurred and for querying the mode selector to determine that the event occurred while a view relationships mode is selected within the mode selector;

one or more graphical object databases for storing relationship and content data for each of the graphical objects;

a relationship filter, operatively coupled to the means for receiving event signals and to the one or more graphical object databases, for retrieving from the graphical object databases relationships involving the first graphical object; and a relationship window builder, operatively coupled to the relationship filter and the graphical object databases, (i) for representing in a relationship window the first graphical object and one or more related ones of the graphical objects, which are related to the first graphical object according to the relationships retrieved by the relationship filter and (ii) for representing in the relationship window the relationships retrieved by the relationship filter.

37. The memory of claim 36 wherein the relationship window builder comprises a display request generator for requesting display of the relationship window in the computer display device.

38. The memory of claim 37 wherein the relationship window builder further comprises a relationship tool builder for including in the relationship window tools which provide a mechanism by which a user can enter relationship alteration commands.

39. The memory of claim 38 wherein the relationship builder alters, in response to relationship alteration commands, one or more of the relationships represented in the relationship window.

* * * * *